April 16, 1963 J. W. FLORA 3,085,966
LIQUID HOMOGENEOUS FUEL ELEMENT AND REACTOR THEREFOR
Filed Nov. 8, 1960 2 Sheets-Sheet 1

FIG. I

INVENTOR.
JOHN W. FLORA
BY
ATTORNEY

INVENTOR.
JOHN W. FLORA

United States Patent Office 3,085,966
Patented Apr. 16, 1963

3,085,966
LIQUID HOMOGENEOUS FUEL ELEMENT AND REACTOR THEREFOR
John W. Flora, Canoga Park, Calif., assignor to North American Aviation, Inc.
Filed Nov. 8, 1960, Ser. No. 68,013
7 Claims. (Cl. 204—193.2)

The present invention relates to homogeneous fluid-fueled reactors and more particularly to a heterogeneous reactor having a plurality of homogeneous fluid-fueled elements.

The homogeneous reactor is generally superior to heterogeneous reactor systems in its inherent safety characteristics. This superiority results from greater gas production per unit energy release and a considerably larger prompt negative temperature coefficient of reactivity. The heterogeneous reactor systems utilized for research generally cannot withstand a period of five milliseconds or less without partial meltdown and have inherent instabilities. Both of these disadvantages are absent from the homogeneous system.

The heterogeneous system has the inherent advantage of fuel element rearrangement, which is particularly desired in research reactors. The easily removable fuel elements also provide a great degree of freedom in irradiation experiments as well as versatility in substituting new fuel elements for experimental irradiation. The homogeneous reactor lacks many of these advantages but offers greater safety and control. The present invention is directed to the combination of a heterogeneous reactor utilizing a fluid homogeneous fuel.

Therefore, it is the primary object of the present invention to provide a homogeneous fluid-fueled reactor having a heterogeneous array of fuel elements where the fluid fuel is confined to the individual fuel elements.

It is another object of the present invention to provide a fuel element having a fluid fuel contained therein which may be substituted for the conventional heterogeneous solid fuel element in a heterogeneous lattice.

It is another object of the present invention to provide a fuel element for a heterogeneous reactor system which combines the advantages of a homogeneous fueled system and a heterogeneous lattice arrangement.

It is a further object of the present invention to provide a fluid-fueled heterogeneous reactor fuel element where no fuel is circulated outside of the core region.

It is a further object of the present invention to provide a fuel element which has a large prompt negative temperature coefficient of reactivity, and a negative gas or void coefficient comparable to that demonstrated for homogeneous reactors, which may be substituted for a heterogeneous fuel element.

These and other objects of the present invention will be more apparent from the following detailed description and drawings hereby made a part of the specification, in which.

Figure 1:
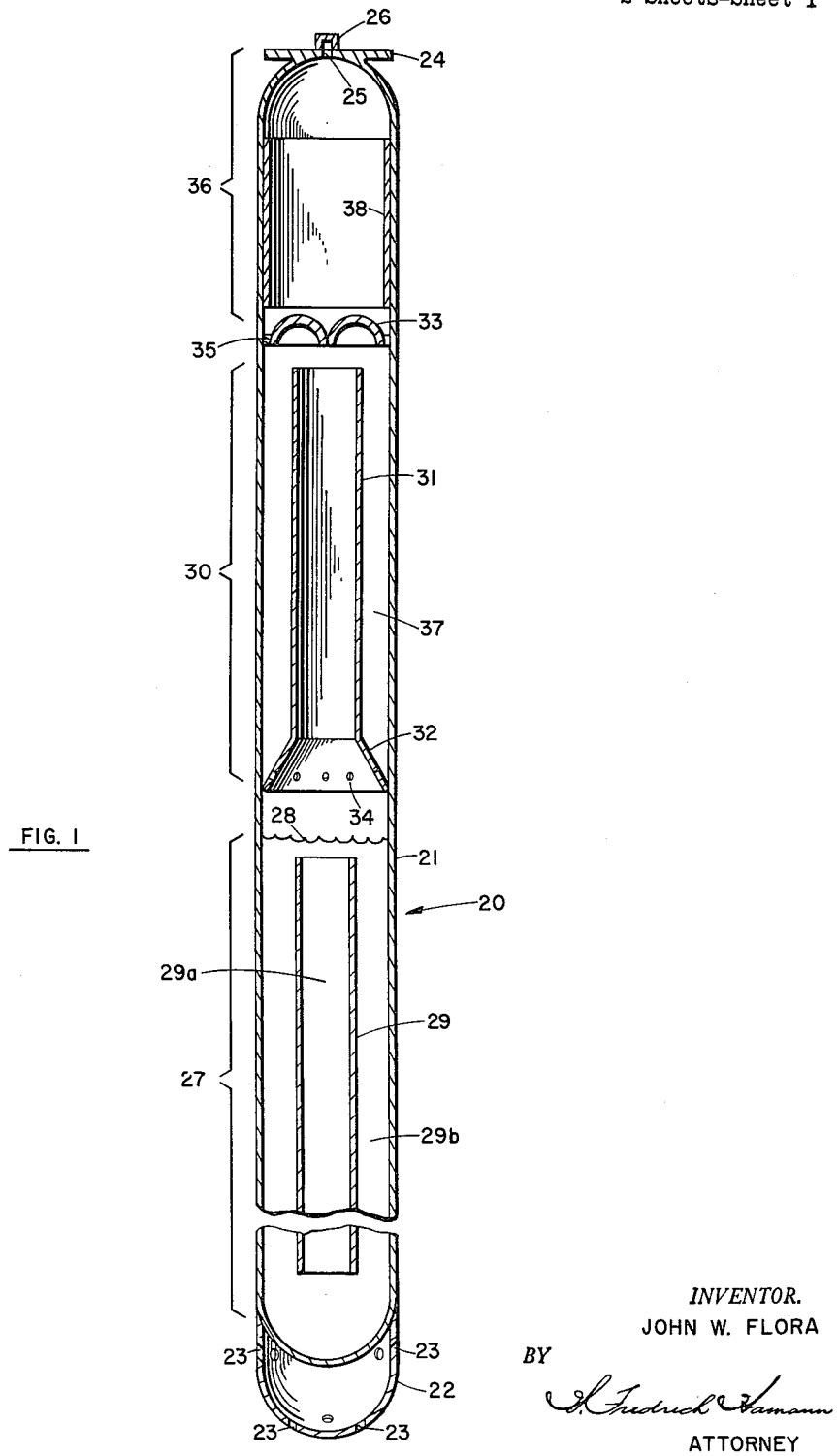
FIGURE 1 is a sectional view of the fuel element of the present invention.

Referring now to the drawings, the preferred embodiment of the fuel element 20 of the present invention is shown in FIGURE 1 and comprises a container 21 preferably of stainless steel of circular cross section having an extension 22 welded or otherwise integrally attached to the bottom. The extension 22 provides a support for the fuel element on the bottom grid of the reactor core so that the fuel is spaced from the grid and localized hot spots are avoided. The extension 22 may be provided with apertures 23 for the passage of coolant. The top of the container 21 is provided with a fuel element lifting shoulder 24 and has a filling port 25 which is sealed by a cap 26.

The container 21 of the preferred embodiment is 44 in. long without the extension 22, with a 3 in. O.D., for example, and a 0.03 in. wall thickness. Within the container 21 is a fissionable material containing fluid, preferably an aqueous solution of a fissionable material, e.g., uranyl sulfate, uranyl nitrate, where the uranium is enriched. Other aqueous solutions known in the art of homogeneous reactors may also be utilized; however, uranyl sulfate is preferred because of its well known characteristics. (See Selected Reference Material—United States Atomic Energy Program—Research Reactors, U.S. Government Printing Office, 1955, particularly chapter 1, and U.S. Patent 2,843,543.)

The fuel 27 of the preferred embodiment has a level 28 which is 24 in. above the bottom of container 21 under non-operating conditions. The internal chimney 29 may be supported in any known manner, i.e., by spiders (not shown) to promote convection and bubble induced circulation of the fuel in a standard pattern.

Above the liquid level 28 is a volume 30 preferably 10 in. high having a total volume of 3 liters, in which is located a central chimney 31 having lower liquid directing baffles 32 and upper liquid directing baffles 33. The lower baffles are attached to the container 21 and contain a plurality of holes 34. The upper baffles 33 are supported in spaced relation to the sides of container 21 by radial supports 35 so that gases formed by the radiolytic decomposition of the water of the preferred embodiment may pass upwardly into the recombining volume 36. In this manner in a power excursion which results in heating of and gas evolution within the fuel solution, both causing a rapid expansion, the liquid fuel will rise up the chimney 31 and be directed downwardly into the temporary retention volume 37, having a volume of about 1 liter, where it will be retained for a short period of time while the liquid slowly flows through ports 34 back to the fuel volume 27. Thus, a temporary retention of a portion of the fuel is provided to prohibit repetitive power pulses. The volume above the level 28 is subatmospheric so that vapor pressure recombination may be utilized.

The radiolytic gases passing around the upper baffles 33 into the recombining volume 36 pass over a catalyst 38 which is integrally attached to the wall of container 21. The catalyst 38 recombines the radiolytically dissociated hydrogen and oxygen gases and is cooled by the coolant-moderator-reflector of the reactor which surrounds the entire fuel element 20. Increased cooling of the catalyst may be attained by adding coolant fins to the container if desired. Increased heat transfer area for the entire fuel element may also be provided by having fins along the outside surface of the container 21 or by using a container 21 having corrugated walls.

The fuel element 20 may be substituted for the ordinary plate or tube-type solid fuel elements utilized in reactors of the prior art, e.g., tank-type or pool-type reactors, which reactors are well known in the art. (See Research Reactors, chapter 2 for fuel requirements and fuel element arrangements.)

The calculation of the concentration of uranium in the fuel solution within the individual elements, which can be made according to any of several accepted methods, is based upon the required geometry and total number of fuel elements to be utilized in a given reactor lattice. The results of these calculations may be compared to the large volume of experimental data which has been made available on the criticality parameters of aqueous fissile solutions. (See, for example, the Reference and Selected Reading List, TID–7016, pp. 23 and 24.)

The variability of uranium concentration and solution volume within each of the fuel elements points out other advantages of this concept of homogeneous fuel elements. The active volume of the reactor core may be changed without destroying the existing fuel elements (to recover the fissile material) merely by appropriate changes of the volume of solution in each element, and/or the uranium concentration in each element, and/or the number of elements employed in the assembly. Also, by varying the uranium concentration among the elements one can achieve an approximation of a flat flux reactor.

The fissionable component of the preferred fuel, $UO_2SO_4$ in ordinary water, is enriched in the isotope U–235 to a value of about 90 percent in the preferred embodiment, although it is within the purview of the present invention to utilize other enrichments or other fissionable materials such as Pu–239 or U–233. The configuration of the critical region approximates a right circular cylinder of the heterogeneous type and calculations of critical mass, fuel-moderator ratios, etc., may be made in accordance with standard techniques.

The heat generated in the core will be greatest in the center of each fuel element, since the outer surface is cooled. In this manner a natural convection circulation of the fuel is attained within each fuel element. The convection circulation will be upwardly within the volume 29a of the chimney 29 and downwardly in the annular volume 29b. Thus, hydrogen and oxygen produced by the radiolysis form as microscopic bubbles distributed through the fuel volume 27 and will be swept upwardly toward the chimney 31. The buoyancy of these bubbles will also aid the convection circulation. These bubbles normally represent a small fraction of the total fuel solution volume during normal operation because their individual residence time is short (of the order of 1–3 sec.) and therefore they will have little effect upon reactivity in the core. If a power surge is sufficient to cause either the instantaneous vaporization of a large portion of the water in region 27, or a considerable volume of radiolytic gas, then a large volume of bubbles will be formed which will cause the rapid displacement of a portion of the fuel into the volume 30 and automatically terminate the reaction until the displaced fuel has slowly returned from volume 37. Thus, automatic control utilizing the large negative temperature gas void coefficients of reactivity of the fuel is provided in the fuel element of the preferred embodiment.

Figure 2:
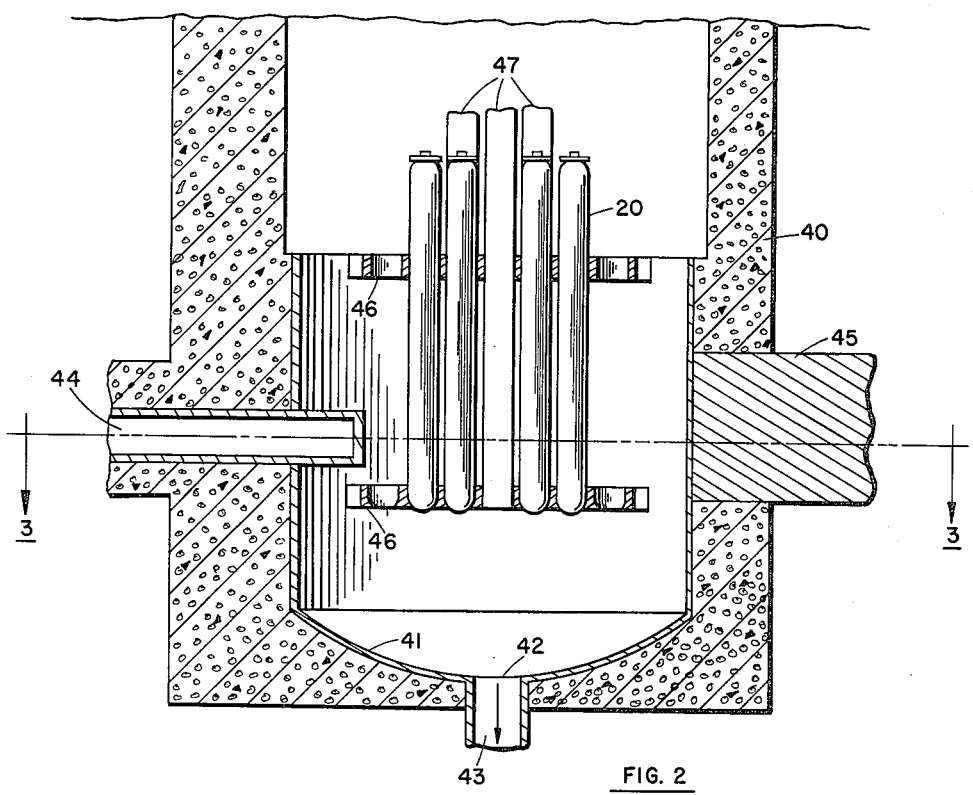
FIGURE 2 is a vertical section of a core of a tank- or pool-type reactor utilizing the fuel element of the present invention.

FIGURE 2 shows an example of a core arrangement utilizing the fuel element of the present invention and comprises a shield tank 40 filled with ordinary water having its lower portion covered with a liner 41 which has an aperture 42 connected to a coolant outlet pipe 43 which is connected to a pump (not shown) for forced circulation of the fuel element coolant. Convection cooling may also be relied on, although forced circulation is preferred. Experimental facilities such as a port 44 and thermal column 45 are provided.

Figure 3:
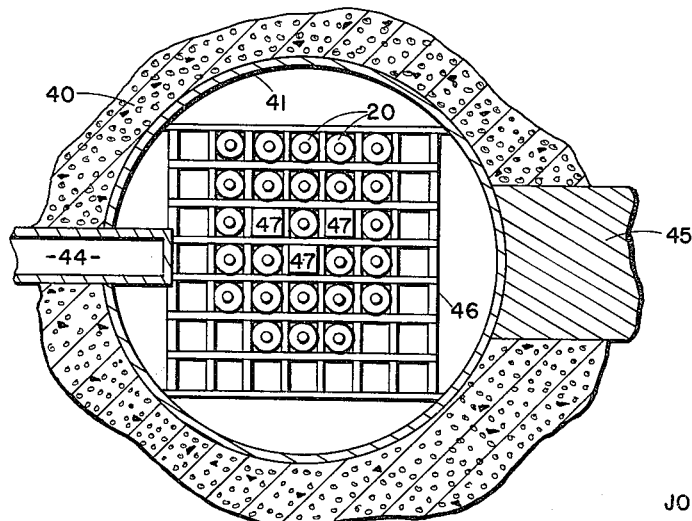
FIGURE 3 is a horizontal section of a core showing the fuel element placement and control rod locations.

An upper and a lower grid plate 46 are welded or otherwise integrally connected to the liner 41, or are supported from the bottom in a pool-type reactor, and form an array of fuel element position openings as shown in FIGURE 3. The lower grid support 46 is provided with restricted openings conforming to the bottom extension 22 so that the fuel elements 20 are supported within the grids 46. The fuel elements extend upwardly above the upper grid plate 46 so that the volume 30 and recombiner volume 36 of the fuel element 20 are above the top grid plate and therefore out of the reactor critical region. In this manner cooler water is available for condensing the recombined gases and the conventional swimming pool core arrangement is maintained. Control rods 47 with their associated mechanisms (not shown) are provided in the core for shutdown as well as fine control.

It is therefore apparent that the present invention provides a novel arrangement and association of parts which results in a nuclear reactor and fuel element having numerous advantages over prior art devices. Although a particular embodiment of the present invention has been described, various modifications will be apparent to those skilled in the art without departing from the scope of the invention. For example, suspensions as well as solutions and heavy water may be substituted for the ordinary water fuel diluent of the preferred embodiment, or well known liquid fuels not requiring external catalytic recombination may be utilized where higher fuel element internal pressures can be tolerated. Therefore, the present invention is not limited to the specific embodiment disclosed but only by the appended claims.

What is claimed is:

1. A heterogeneous nuclear reactor comprising a core, a plurality of fuel elements removably supported in said core; each of said fuel elements comprising a hollow sealed container having a lower section, a volume of aqueous liquid fuel in each section, said volume of liquid fuel containing a portion of the critical mass of fissionable material in liquid form; means for promoting free convection circulation of all of said liquid throughout the entire volume of said lower section, said last-named means including means for removing heat from the outer surface of each of said fuel elements.

2. The heterogeneous nuclear reactor of claim 1 wherein each of said fuel elements contains an upper section and means in said upper section and communicating with said lower section for recombining and condensing radiolytically formed gases generated in said lower section, said last-named means including a portion of the wall of said fuel element in contact with said heat removing means.

3. The heterogeneous nuclear reactor of claim 2 wherein said upper section of each of said fuel elements is located outside the critical region of said core, and in contact with said heat removal means.

4. The heterogeneous nuclear reactor of claim 1 wherein said means for promoting convection circulation includes a centrally disposed tube in said lower section through which said fuel circulates.

5. A fuel element for a nuclear reactor comprising a sealed container having a lower section, a volume of an aqueous liquid containing a fissionable material in said section, said lower section being free of obstruction to the convection circulation of said liquid fuel within the entire volume of said lower section, said volume of liquid containing insufficient fissionable material to individually sustain a nuclear chain reaction.

6. The fuel element of claim 5 wherein said fuel element contains an upper section, said upper section having means for recombining and condensing radiolytically dissociated gases and vapors, and a temporary retention volume including flow directing means for slowly returning condensed vapor to said lower section, said recombiner means and said retention volume communicating with said lower section.

7. The fuel element of claim 5 wherein said lower section contains a centrally located cylindrical baffle means for directing the convection circulation of said liquid fuel upwardly along the center of said section and downwardly along the entire wall of said lower section.

References Cited in the file of this patent

UNITED STATES PATENTS

| | | |
|---|---|---|
| 2,853,446 | Abbott et al. | Sept. 23, 1958 |
| 2,874,106 | Hammond et al. | Feb. 17, 1959 |
| 2,910,417 | Teitel | Oct. 27, 1959 |
| 2,937,127 | Flora | May 17, 1960 |

FOREIGN PATENTS

| | | |
|---|---|---|
| 837,848 | Great Britain | June 15, 1960 |
| 852,877 | Great Britain | Nov. 2, 1960 |

OTHER REFERENCES

Glasstone: Principles of Nuclear Reactor Engineering, 1955, page 52. (Copy in Div. 46.)